(No Model.) 3 Sheets—Sheet 1.

W. F. FRAMBACH.
FANNING MILL.

No. 588,972. Patented Aug. 31, 1897.

(No Model.) 3 Sheets—Sheet 2.

W. F. FRAMBACH.
FANNING MILL.

No. 588,972. Patented Aug. 31, 1897.

Witnesses:
L. C. Hills.
B. C. Frazer

Inventor:
Wm. F. Frambach,
By Glascock & Leo
Attys.

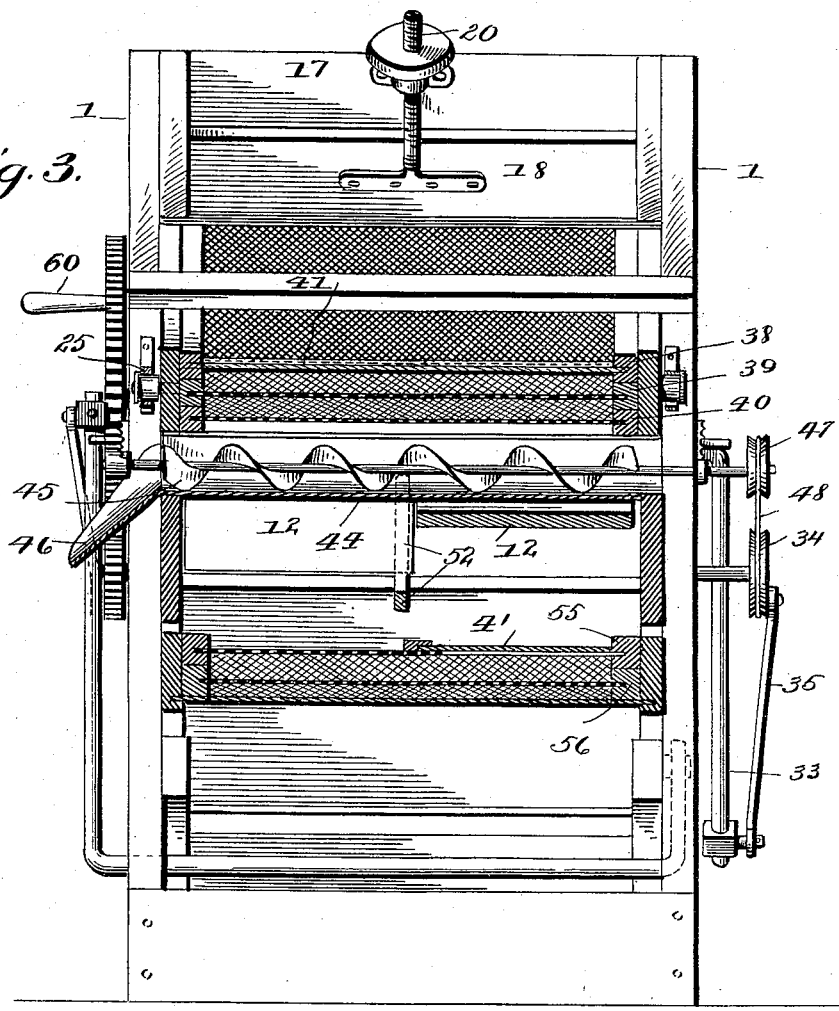

UNITED STATES PATENT OFFICE.

WILLIAM F. FRAMBACH, OF CHEROKEE, IOWA.

FANNING-MILL.

SPECIFICATION forming part of Letters Patent No. 588,972, dated August 31, 1897.

Application filed January 30, 1897. Serial No. 621,339. (No model.)

*To all whom it may concern:*

Be it known that I, WILLIAM F. FRAMBACH, a citizen of the United States, residing at Cherokee, in the county of Cherokee and State of Iowa, have invented a certain new, useful, and valuable Improvement in Fanning-Mills, of which the following is a full, clear, and exact description.

My invention has relation to fanning-mills; and it consists in the novel construction and arrangement of its parts, as hereinafter described.

The object of the invention is to provide a mill having longitudinally-moving screens.

The further object of the invention is to provide a fanning-mill that will separate one kind of seed from another and to provide valves for regulating the blast of air to be applied to each kind of seed.

The further object of the invention is to provide a means for removing the dirt from the fanning-mill as soon as possible.

Figure 1:
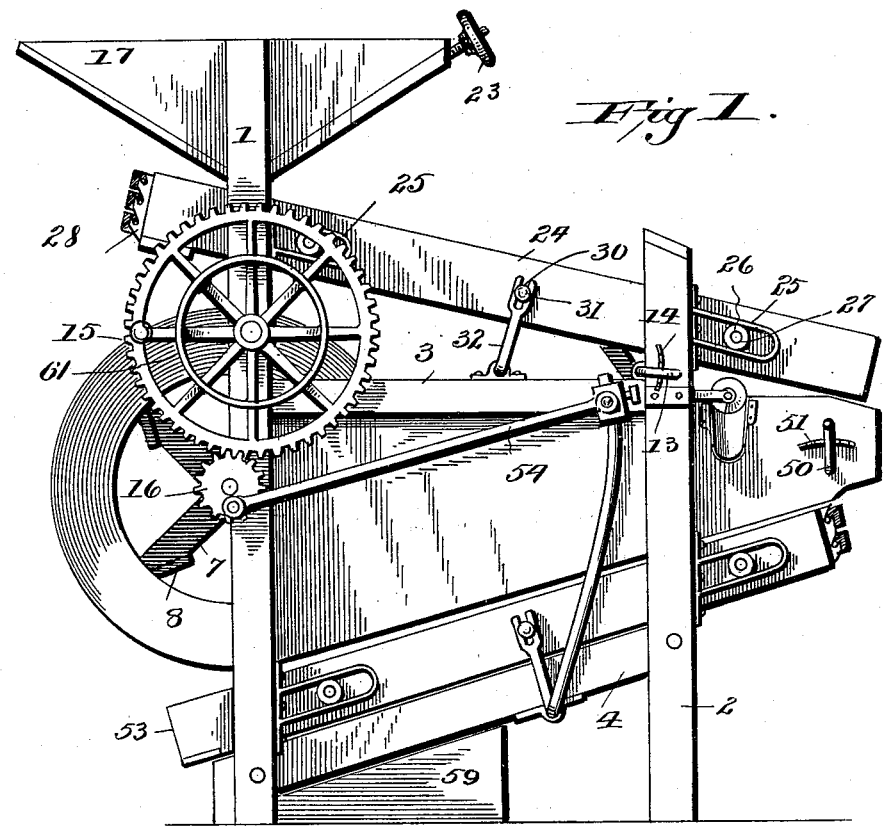
Figure 2:
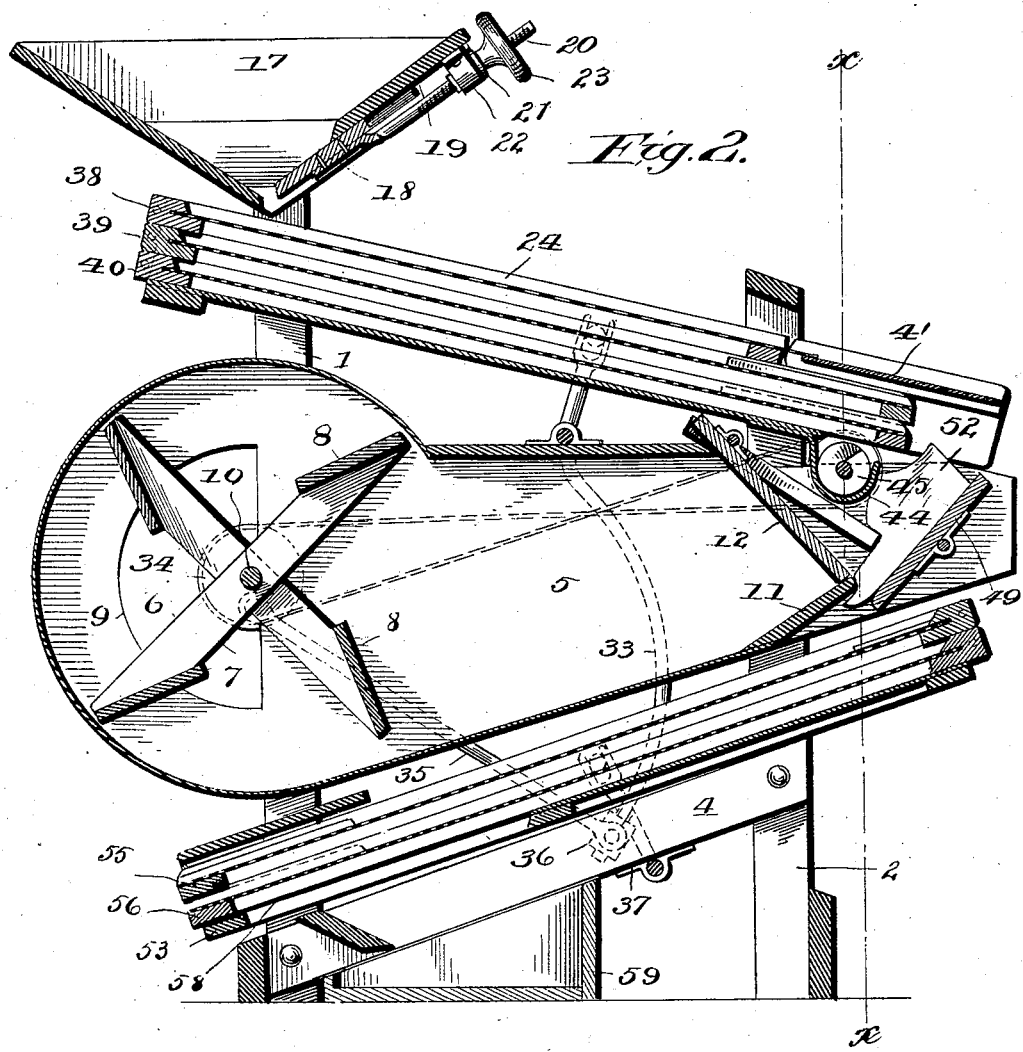
Figure 6:
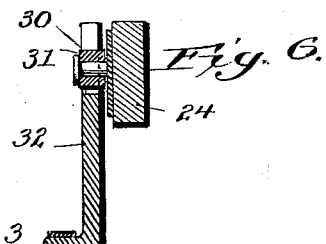

In the accompanying drawings, Figure 1 is an elevation of the fanning-mill. Fig. 2 is a longitudinal sectional view of the fanning-mill. Fig. 3 is a transverse sectional view cut on the line *x x* of Fig. 2. Fig. 4 is a perspective view of the upper set of screens. Fig. 5 is a perspective view of the lower set of screens. Fig. 6 is a sectional view of a detail and will be explained hereinafter.

The framework of the mill consists of the upright standards 1 1 and 2 2. Said standards are connected by the horizontal bars 3 3 and the inclined bars 4 4. The fan-casing 5 is located between the two sets of standards and is supported thereby. The said fan-casing is provided at one end in its interior with the revolving fan 6, said fan consisting of the cross-pieces 7, forming the spokes, and the blades 8, located at the ends of the spoke 7. The said spokes are beveled at their outer ends, and the blades are secured to the beveled surfaces, as shown in Fig. 2. The fan-casing is provided with the air-inlet 9. The shaft 10 of the fan 6 is journaled to the uprights 1 1. The outer end of the fan-casing 5 is reduced, as shown in Fig. 2, and said end is provided with the upwardly-inclined partition 11. The valves or gates 12 12 are pivotally mounted in the top of the fan-casing, and when said gates are closed their lower edges come in close proximity to the upper surface of the inclined partition 11, as shown in Fig. 2. The valves or gates 12 are manipulated by means of the handles 13, which pass out on opposite sides of the fan, and said handles are adapted to engage on their under sides the racks 14, said racks in turn being secured to the standards 2, said racks presenting sufficient frictional contact to retain the handle 13 at any desired point thereon, and thus the slant of the gates 12 may be regulated. The cog-wheel 15 is journaled to one of the standards 1 and said cog-wheel meshes with the smaller cog-wheel 16, which is fixed to the end of the fan-shaft 10.

The hopper 17 is supported at the upper ends of the standards 1, said hopper at its opening provided with the slide 18, said slide working in the guides 19. The threaded rod 20 is secured at one end to the slide 18. Said rod passes through the threaded collar 21, which is loosely journaled in the bearing 22, said bearing in turn being secured to the side of the hopper. Said collar is provided with the annular extension 23, by means of which the collar is revolved. As the collar 21 is revolved the rod 20 is worked either back or forth through the bearing 22, and thus the slide 18 is moved back or forth, and the opening to the hopper 17 is regulated.

Below the hopper 17 the downwardly-inclined screen-casing 24 is located, said screen-casing passing between the standards 1 1 and 2 2. The standards 1 1 and 2 2 are provided with the downwardly-inclined ways 25 25, and the sides of the screen-casing 24 are provided with the outwardly-extending pins 26, said pins supporting the friction-rollers 27 and said rollers in turn engaging the ways 25. The ways 25 are substantially U-shaped, and when the parts are in position it is impossible for the friction-rollers 27 or the pins 26 to disengage the ways. The forward end of the screen-casing 24 is provided with the ordinary racks 28, and the upper ends of the screens located in the casing 24 are provided with the outwardly-extending pins 29, which are adapted to engage said racks. The sides of the casing 24 are provided with a pin 30, said pin being surrounded by an antifriction-collar 31, as shown in Fig. 6. The arms 32 are suitably journaled to the cross-bars 3. Said arms are connected, and the upper ends of said arms are bifurcated, said bifurcations surrounding the friction-collars 31 on the pins 30. The downwardly-extending rod 33 is connected to the arms 32, and as the lower end of said rod 33 is moved back and forth the upper ends of the arms 32 are moved back and forth, and thus the screen-casing 24 is given a longitudinal movement. The end of the fan-shaft 10 opposite to that on which the wheel 16 is located is provided with a pulley-wheel 34, and on said pulley-wheel is eccentrically journaled the end of the pitman 35. Said pitman at its other end is pivotally connected to the adjustable collar 36, said collar in turn being located on the bar 33. The said bar 33 is curved, as indicated in Fig. 2, and is substantially in an arc with the eccentric journal on the pulley 34 as a center. The collar 36 is provided with a set-screw 37, and thus the said collar can be secured at any desired point of the rod 33.

It will be seen that as the collar 36 is shifted up the movement of the arms 32 will be magnified.

The casing 24 is adapted to hold three screens 38, 39, and 40, said screens being located in the casing, as shown in Fig. 2. The screen 38 is provided with a coarse meshing, and at the lower end of said screen is the metallic plate 41. The said screen 38 is preferably made of perforated sheet metal, and the plate may be slipped on the end of the sheet, as shown in Figs. 4 and 2. The said plate, when in position, will carry the dirt and chaff and straw to the extreme end of the fan, from which it is thrown entirely out of the machine.

The screen 39 is of finer mesh and is adapted to convey the coarser seed to the end of the fan. The screen 40 has the finest mesh and is adapted to convey the smallest seed. The screen 39 is provided at its lower end with a diagonally-disposed slat 42. Said slat is adapted to convey the coarse seed to one side of the fan. The screen 40 is also provided with a diagonally-disposed slat 43. Said slat is adapted to convey the smallest seed to the opposite side. The relative positions of the screens and slats are shown in Fig. 4.

The fan-casing 5 is provided at its outer end with the trough 44, said trough extending transversely across the fan-casing. The spiral conveyer 45 is suitably journaled in the frame of the fan, said conveyer being located in said trough 44. At one end said trough is provided with the spout or chute 46. One end of the conveyer-shaft is provided with a pulley-wheel 47, which is operated by a cross-belt 48 from the pulley-wheel 34. Said conveyer is adapted to force all matter that passes through the screen 43 to the side of the fan and out through the spout 46.

The fan-casing at its outer end is also provided with the pivoted cross-piece 49. One end of the shaft on which said cross-piece is fixed extends through the side of the fan-casing and is formed in the handle 50. (See Fig. 1.) Said handle is adapted to engage the rack 51, and the frictional contact of this engagement retains the handle in any desired position, and hence the slant of the cross-piece 49 may be regulated.

When it is desired to separate the seed—that is, to separate seed of one kind from seed of another—the partition 52 is placed in position, as shown in Fig. 2, and thus the seed is deposited on the screens below in two columns or streams, and by manipulating the valves 12 a greater draft of air may be sent through one column than through the other.

The lower screen-casing 53 is similar in its construction and in the way that it is mounted on the framework of the machine to that of the casing 24, an exception being that the lower casing is disposed or inclined in the opposite direction. Said lower casing 53 is operated by the pitman 54, eccentrically journaled to the cog-wheel 16, the connection between the pitman 54 and the casing 53 being similar to the connection between the pitman 35 and the casing 24.

Preferably the lower casing 53 contains but two screens 55 and 56. The screen 55 is provided at its corner with a removable plate 57, and thus when it is desired to pass the finer seed from the screens above directly to the screen 56 the plate 57 is removed, and the seed from the screen 43 passes through the opening in the screen 55 and is deposited at the upper end of the screen 56.

The screens 55 and 56 are provided at their lower ends with the diagonally-disposed slats, as shown in Fig. 5, the object of said slats being to discharge the seed from the fan in separate piles.

When the fanning-mill is treating seed all of the same kind, the plate 57 is not removed, nor is the partition 54 used, and the valves 12 12 are both pitched at the same angle.

The lower casing 53 is provided with the opening 58, through which all objects that pass through the screen 56 are deposited in the drawer 59. The cog-wheel 15 is provided with a handle 60, or the said cog-wheel may be revolved by means of a belt which passes around the belt-wheel 61, located on the side of the wheel, as shown in Fig. 1. Any suitable power may be applied for operating the fan. Thus it will be seen that I provide a fan having two sets of screens, each set having a longitudinal movement. The fan is also adapted to treat and separate seed of different kinds and is provided with a means for regulating the draft applied to the different kinds of seed, and is adapted to classify the seed and deposit each kind in a separate pile.

Having described my invention, what I claim as new, and desire to secure by Letters Patent, is—

1. A fanning-mill consisting of two sets of screens, a revolving fan located in the casing and adapted to discharge a blast of air between the two sets of screens, said screens provided with a means for separating different kinds of grain, a valve having independent movable sections located at the end of the fan-casing and adapted to regulate the blast and a removable partition adapted to be applied at the end of the fan-casing between the two sets of screens and adapted to keep separate the different kinds of grain as it passes from one set of screens to the other.

2. A fanning-mill having two sets of screens, a suitable means for supplying a blast, the upper set of screens adapted to separate grain of different kinds, the upper screen in the lower set having a valve whereby the finer grain may be deposited on the lower screen of the lower set, a removable partition adapted to be applied at the ends of the screens and adapted to keep separate the different kinds of grain as it passes from one set of screens to the other.

In testimony whereof I affix my signature in presence of two witnesses.

WILLIAM F. FRAMBACH.

Witnesses:
F. W. MELTER,
G. R. CORRINGTON.